March 27, 1962 S. WIKNE 3,027,266
POROUS STRUCTURES
Filed Jan. 9, 1958

INVENTOR.
SVERRE WIKNE

ATTORNEYS

United States Patent Office 3,027,266
Patented Mar. 27, 1962

3,027,266
POROUS STRUCTURES
Sverre Wikne, Salhus, near Bergen, Norway
Filed Jan. 9, 1958, Ser. No. 708,047
Claims priority, application Norway Feb. 19, 1953
7 Claims. (Cl. 106—86)

This invention relates to the formation of porous structures of hydraulic cements, such as Portland cement, and similar materials, and provides a novel process by which structurally sound lightweight bodies may be made.

Numerous hydraulic cements have long been used for building purposes, and are particularly well-suited where structures to be subjected to compressive loads are desired. A disadvantage of materials of this type, however, is their heaviness and also the fact that they are not particularly good thermal insulators.

The present invention provides porous structures of hydraulic cements which have been found to possess high compressive strength but at a great reduction in weight. Such structures are accordingly far easier to handle, impart leser bearing loads on the supporting material which permits heavier or larger loading from other sources, and also possess quite good thermal insulation characteristics.

In general, the structures of this invention are formed by adding and mixing water-insoluble aqueous gel pellets with a plastic water-containing hydraulic cement composition, and thereafter casting the mixture to the desired form and permitting the composition to harden and the gel water to evaporate from the pellets. The pellets should of course, be sufficiently durable mechanically to permit the necessary mixing, but numerous gel materials having these characteristics are well-known in the art. The proportion of pellets to the cement composition will of course, depend on the porosity desired, but in any case, sufficient cement composition to serve as a binder and provide a structural bond for the structure should be present. Inasmuch as these factors will be subject to considerable variation depending on the particular characteristics desired and the particular cement to be used, and are also well within the known concepts in this field, no detailed discussion of them is necessary for a full understanding and appreciation of this invention.

Suitable hydraulic cement compositions include Portland cement; hydraulic lime cements and mortars; gypsum cements such as plaster of Paris, Keene's cement (also known as flooring cement or tiling plaster), Parian cement, Martin's cements; magnesium oxychloride or Sorel cement; magnesia cement; magnesium sulfate cement; Pozzuolana cement; slag cements; stabilized soils; and other cements which are hardenable plastic aqueous compositions. Cements of this type are generally characterized by the fact that the strength of them is not seriously affected by the presence of water. Such cements are well-known by the term "hydraulic cement" which is used herein and in the appended claims to refer to cements of this type.

The formation of the cement for use in this invention is in accordance with well-known conventional techniques, and will accordingly include water and also aggregate filler materials commonly employed, such as sand, gravel, cinders, vermiculite, sawdust, wood shavings and the like. It is important to the invention, however, that the cement composition be mixed up with the requisite water before the gel pellets are added so that during the addition and mixing in of the pellets the cement will be of maximum fluidity. The mixing in of the pellets may then proceed with greatest ease and with minimum breakage of pellets. The mixing of the pellets with the dry cement mixture prior to the addition of water should be avoided, since breakage and dehydration of the pellets, along with localized wetting of the cement mixture from the gel water removed from the pellets is likely to result. In addition to the hydraulic cements, porous ceramic structures may be formed in accordance with this invention by the addition of the gel pellets to the wet clay from which bricks are made. The molded structures are permitted to dry thoroughly and are then fired in the usual manner.

The gel pellets may be formed of any of numerous materials which form aqueous gels, and are preferably formed of those substances which form mechanically rigid or durable gels which are able to withstand the mixing with the cement or clay without breaking up. Preferred gels are formed of a gel-forming substance which is subsequently treated to harden the pellets. Examples of suitable aqueous gel-forming materials are alginates, e.g. sodium alginate or alginic acid; alkali soluble and water soluble cellulose derivatives, e.g. carboxymethyl cellulose, methyl cellulose, hydroxyethylcellulose; agar agar; gelatine, starch and its degradation products; casein derivatives e.g. alkali caseinates; glutenates and its degradation products; hide or bone glue; gums such as arabic and karaya; water glass; polyvinyl alcohol; and clays such as china clay.

Among those mentioned, the preferred gel-forming substances are cellulose derivatives, the degradation products of starch, and alginates.

Cellulose derivatives such as carboxy methyl cellulose will generally readily form viscous solutions and jellies containing extremely high amounts of water and will also be quite cohesive. Hard durable pellets may accordingly be formed of them.

Other suitable materials are the casein and gluten derivatives, sodium casein sulfate and sodium gluten sulfate described in Industrial and Engineering Chemistry, vol. 36, p. 1149. These can conveniently be formed cheaply from defatted soya flour or peanut flour.

In forming the pellets a convenient technique consists in forming a viscous solution or suspension of the gel-forming substance and water in proportions suitable for gel formation, and then separating appropriately sized masses of the solution and causing them to harden. Conveniently, the solution or suspension of gel forming material is broken up or subdivided into pellet size in a hardening bath in which the hard pellets are formed.

The pellets may be used immediately after their formation, but frequently it is preferable to dry the pellets for storage or shipment and then to immerse them in water to swell them just prior to their use. By this technique, pellets may be economically formed at any convenient central location and shipped at minimum expense to the sites where they are to be used.

Drying of the pellets is most conveniently accomplished by extracting the water with a water-miscible liquid, such as methanol, ethanol, isopropanal, acetone or similar materials, and then evaporate the volatile liquid from the pellets.

To assist the swelling of dried pellets, swelling aids may be added either to the pellets or to the water with which they are swelled. Swelling aids may also be added to the pellets for softening the gel because gels that are too hard are apt to lose water. Suitable swelling aids include generally organic bases such as quaternary ammonium bases, amines such as triethanolamine, ammonia, pyridine, guanidine and formamide. Swelling agents of this type are effective with both cellulose derivatives and alginates.

Dried pellets are conveniently formed during the manufacture of the gel-forming material, particularly where a final concentration of the gel-forming material is appropriate to pellet formation. A quantity of it may readily be formed into pellets and then dried to be used subsequently, as by swelling them and combining them with cement, clay or gypsum composition.

This invention is further described below with reference to presently preferred embodiments selected for purposes of illustration. Reference is made to the drawings in which.

Figure 1:
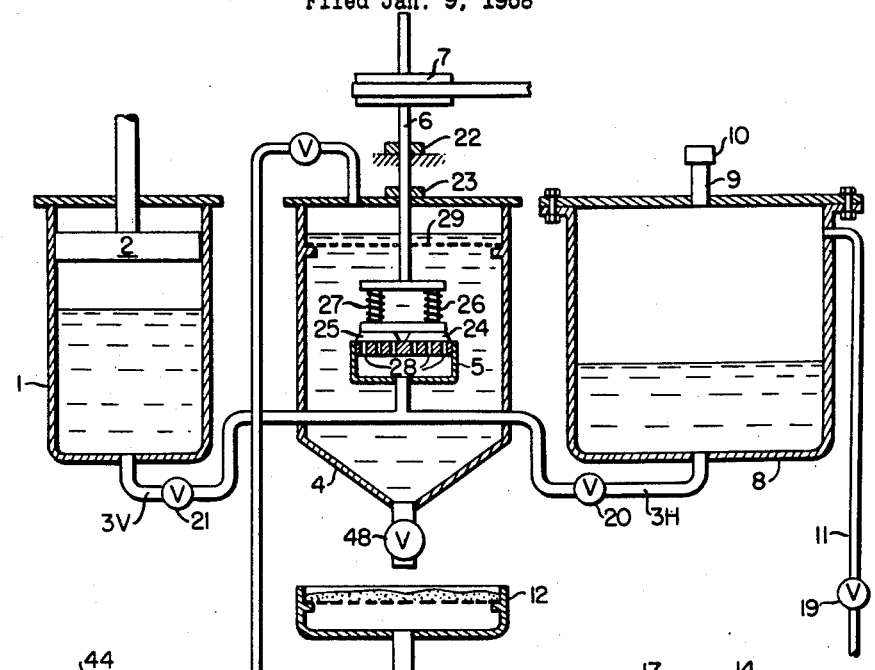
FIG. 1 shows schematically suitable apparatus for forming gel pellets.
Figure 2:
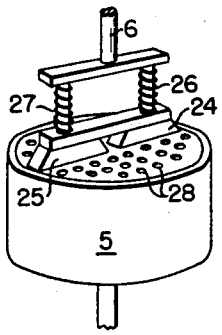
FIG. 2 is a perspective view of a pellet-forming extrusion head.

The pellets are most conveniently formed by first forming a gel-forming solution or suspension, and then subdividing the mass of liquid into pellet-size particles in the presence of a hardening bath. Suitable apparatus, as shown in FIGS. 1 and 2, utilizes an extrusion head 5 having for its upper surface a foraminous plate 28. The top surface of the plate 28 is wiped by brushes or blades 24 and 25 such that when the gel-forming solution or suspension is forced from the head through the plate 28, the wiping of the brushes 24 and 25 divides the exuding streams into pellet-sized particles.

The brushes 24 and 25 are carried on a shaft 6 mounted for rotation by a pulley 7 and belt 30 in bearings 22 and 23, and are urged by springs 26 and 27 into close contact with the foraminous plate 28.

The extrusion head 5 and associate brushes or blades 24 and 25 are mounted in a tank 4 in which the hardening bath is contained, so that the pellets from the extrusion head 5 are formed in the presence of the hardening bath. A screen 29 submerged near the top of the bath level in the tank 4 permits the formation of pellets of buoyant materials by holding them submerged in the bath.

In the illustrated embodiment the extrusion head 5 may be fed either from a pneumatic reservoir 8, which connects through a valved conduit 20, or from a cylinder 1 provided with a piston 2, which connects through a valved conduit 21. The pneumatic reservoir 8 is provided with an inlet 9 fitted with a tight cover 10, by which a charge of gel-forming suspensions or solution may be introduced, and connects with a gas pressure line 11 through a control valve 19 by which gas pressure may be applied to the gel-forming liquid and delivered to the extrusion head.

If desired, however, the gel-forming liquid may be fed to the extrusion head 5 from the cylinder 1 by applying force to the piston 2.

The pellets that are formed are collected in the hardening bath, and are then drained through a valve 48 to a screen 12 which in turn drains to a collecting vessel 13 through a valve 18. A conduit 15 from the bottom of the collecting vessel 13 permits return of the hardening bath after the pellets have been screened out, conveniently by applying gas pressure to the vessel 13 through a conduit 14 which connects with the vessel 13 through a control valve 17.

Figure 3:
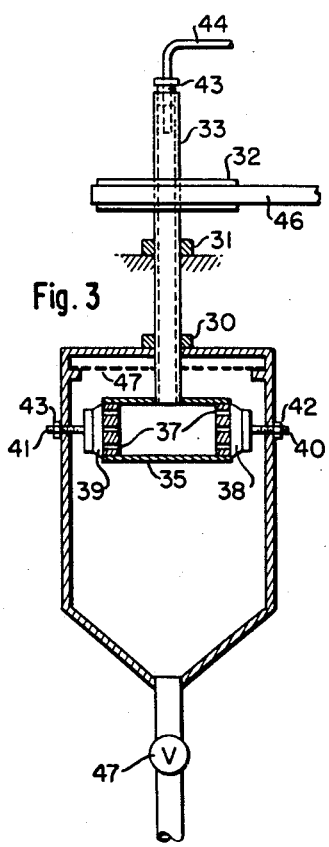
FIG. 3 is an alternative pellet-forming apparatus.

In FIG. 3 is shown an embodiment of an extrusion head which employs staionary brushes 38 and 39 which wipe the formainous cylindrical walls 37 of a rotating extrusion head 35, carried by a hollow shaft 33 to which the gel-forming liquid is fed, as by a conduit 44 connecting through a sealing box 43. The shaft 33 is carried by bearings 30 and 31 and is driven through a pulley 32 which is engaged by a drive belt 46. The tank 34 for the hardening bath surrounds the extrusion head and carries the brushes 38 and 39 on threaded shafts 40 and 41 carried by nuts 42 and 43 by which the position of the brushes may be adjusted. A screen 47 across the top of the tank 34 may be provided to hold buoyant pellets submerged in the hardening bath.

The formation of typical pellets is described in detail in the following examples.

*Example 1*

Sixty kilograms of newly harvested wet seaweed, such as *Laminaria digetata, Laminaria hyperborea* or other seaweed containing alginic acid, are washed three times for thirty minutes in 0.1 N HCl at a temperature of about 40° C., and are then washed for thirty minutes in fresh running water. The alginic acid in the washed seaweed is now determined in well known manner, and to neutralize this and bring the same into solution, an equivalent quantity of sodium carbonate is added in form of an aqueous solution, preferably one of concentration to form 1.5% solution of sodium alginate.

The viscous alginate solution is then formed into pellets as by means of the apparatus described above, in the presence of a hardening bath consisting, for instance, of a 1 percent aqueous calcium chloride solution. The pellets are then separated from the bath for subsequent addition to the cement composition.

If desired, pellets formed of alginates and the like, can be further hardened for instance, by treating them with basic beryllium and chromium salts and formaldehyde as described in U.S. Patent No. 2,409,319. Or they may be added with the product of condensation of formalin and urea, formalin and melamine, and so on.

*Example 2*

5 kilograms of carboxy methyl cellulose, such as the Dutch product designated A.K.U.-CMC, Type HC, is dissolved in 125 gallons of water to which are added 3 grams of copper sulfate in 1 liter of water. The solution is thoroughly mixed and is then formed into pellets in the presence of a hardening bath consisting of a 2% aqueous solution of alum.

*Example 3*

33 kilograms of fish or fish refuse, e.g. heads, tails, entrails and so on, in the fresh wet condition, are dissolved by stirring them in 17 liters of an alkaline solution containing 1 kilogram of sodium hydroxide. After stirring for about 2 hours at a temperature of 40–50° C., the fish is dissolved, and the solution is strained to remove bones and other undissolved matter, and is then acidified by the addition of dilute sulfuric acid to adjust the pH to between about 5.2 and 7. 150 liters of an aqueous 1.5 percent sodium alginate solution is then added to the fish solution, and the mixture is whipped to a froth having a total volume of about 400 liters. To this is added, 10 grams of copper sulfate dissolved in a liter of water. The froth is then formed into pellets in a hardening bath consisting of an aqueous 2 percent calcium chloride solution, conveniently by means of the apparatus described above. The pellets are allowed to harden in the bath and are then separated for subsequent addition to the cement.

*Example 4*

10 kilograms of potato starch are dispersed in 100 liters of a solution containing 20 grams of calcined sodium carbonate and 30 grams of hydrogen peroxide, and the solution is then heated, conveniently by introducing live steam, to a temperature of about 90° C. where it is held for about ½ hour during which the solution is continuously stirred. This treatment results in a viscous solution of a degraded starch which is then permitted to cool to about 40° C. at which time a solution consisting of 3 kilograms of sodium alignate dissolved in 62 gallons of water is added, together with 5 grams of copper sulfate dissolved in 1 liter of water. The solution is then formed into gel pellets in a hardening bath consisting conveniently of a 2 percent aqueous solution of calcium chloride, for instance, in the manner and by the apparatus described above. After the pellets have hardened in the bath, they are removed for addition to the cement.

Example 5

Dry pellets of alginates are conveniently formed in the manner outlined in Example 1 by including in the gel-forming composition, .005 percent based on the weight of solids, of tetraethyl ammonium hydroxide to facilitate swelling of the pellets after they have been dried. The pellets are formed in the manner described in Example 1 and are then dehydrated by first extracting the water from them by denatured ethanol and then drying them in air. The dried pellets may readily be rewet, for instance by immersing 7 kilograms of dry pellets in 425 liters of water to which has been added .01 percent of tetra ethyl ammonium hydroxide. After about 4 hours, the pellets will have absorbed about 400 liters of water, and may be separated from the remaining water and incorporated as the pore-forming aggregate.

Example 6

The same procedure as described in Example 5 is carried out except that the original gel-forming solution has added to it, 3 percent based on the weight of solids of tri-ethanol amine instead of tetra ethyl ammonium hydroxide. The dry pellets which result are conveniently swollen by adding 7 kilograms of them to 425 liters of water to which has been added 10 kilograms of triethanol amine. The pellets when swollen will have absorbed about 400 liters of water.

Example 7

Dried pellets of carboxy methyl cellulose may be formed from the gel-forming composition described in Example 2, preferably by incorporating in the composition, a swelling agent such as 3 percent based on the weight of solids of tri-ethanol amine. After the pellets have been formed, they are first extracted of water in a water-miscible organic solvent which is then dried from the pellets. The dried pellets are conveniently swollen by immersing them in the ratio of 7 kilograms of pellets to 425 liters of water to which has been added 7 liters of tri-ethanol amine. When swollen, the pellets will have absorbed about 400 liters of water.

As a hardening bath, a solution of a soluble salt of iron or zinc may be used in place of the calcium or aluminum salts of the preceding examples.

Any of the pellets described above may conveniently be incorporated into a hydraulic cement composition or into plastic ceramic-forming compositions as pore-forming aggregates. Dried pellets may also be added to hydraulic cements to which an excess of water has been added along with a small amount of a swelling agent, to swell in situ. When this is done, it is generally desirable that the pellets swell as quickly as possible, and for this purpose, it is generally advantageous that the dried pellets be ground rather finely. It has been found for instance, that dried calcium alignate pellets, formed for instance by immersing sodium alignate gel pellets formed by the procedure described in Example 1 in a calcium chloride solution until the sodium is replaced by calcium, having when dry, a mesh size of about 30 per square centimeter will require about 4 hours to swell. The same pellets when ground to a mesh size of 900 meshes per square centimeter may be swollen with 100 times their own weight of water in about 3 minutes.

A typical procedure for forming a porous Portland cement composition consists in first mixing 50 kilograms of Portland cement and 150 kilograms of sand with sufficient water to form a plastic hydraulic cement composition. When this has been formed, 200 liters of wet gel pellets are added and mixed in and the cement composition thus formed is cast in the usual manner.

Similarly good results are obtained by mixing 50 kilograms of Portland cement with 200 liters of fermented sawdust to which is aded sufficient water to form the plastic hydraulic cement composition. 200 liters of wet gel pellets may then be added and mixed in to produce a pore-forming Portland cement composition.

In any case, it will be advantageous to mix the hydraulic cement composition thoroughly before the pellets are added and to utilize no more mixing action than is necessary after the pellets have been added. When using an ordinary concrete mixture, it is preferable to run the mixture as slowly as possible, generally at about one-half the ordinary speed.

Another suitable technique consists in utilizing rotating inclined pipes carrying longitudinal internal lift bars by introducing the premixed hydraulic cement and the pellets into the upper part of the pipes to be mixed as they progress downwardly through them. A mild, yet adequate, mixing action has been found to result.

A porous structure is formed in the practice of this invention by the gel pellets which remain within the wet hardening hydraulic cement as discrete pieces about which the cement hardens. The pellets thus serve to support the walls of the pores during the hardening of the cement, and after the cement has hardened the pellets dry out through the evaporation of the gel water and the actual voids which constitute the pores are formed.

The structures formed in the practice of this invention are strong yet of greatly reduced weight and are particularly useful in numerous types of building work where weight is to be kept at a minimum. Although the invention has been described with reference to preferred embodiments which are illustrative of it, it is contemplated that various modifications will occur to those skilled in the art, and that such may be made without departing from the scope of this invention. This application is a continuation-in-part of application Serial No. 609,343, filed September 6, 1956, which in turn was a continuation-in-part of application Serial No. 410,159, filed February 15, 1954, both now abandoned.

Having thus disclosed this invention and described in detail preferred embodiments of it, I claim and desire to secure by Letters Patent:

1. The method of making porous structures comprising mixing a plastic water-containing hydraulic cement with solid mechanically durable pellets consisting essentially of an aqueous mechanically rigid gel capable of being dried to particles of reduced dimensions, thereby distributing said pellets within said cement as discrete solid pieces defining pores within a structural bond of cement, forming said mixture, and permitting the cement to harden and the gel water to evaporate from said pellets, whereby a porous structure is formed.

2. A porous structure-forming composition comprising a mixture of a plastic water-containing hydraulic cement and solid mechanically durable pellets consisting essentially of an aqueous mechanically rigid gel capable of being dried to particles of reduced dimensions, said pellets being distributed within said cement as discrete solid pieces defining pores within a structural bond of cement.

3. The method of making porous structures comprising combining substantially dry particles of a gel forming material with water to cause said material to swell and form solid mechanically durable pellets consisting essentially of an aqueous mechanically rigid gel capable of being dried to particles of reduced dimensions, mixing said pellets with a plastic water containing hydraulic cement, thereby distributing said pellets within said cement as discrete solid pieces defining pores within a structural bond of cement, forming said mixture, and permitting the cement to harden and the gel water to evaporate, whereby a porous structure is formed.

4. The method defined by claim 1 wherein the hydraulic cement includes Portland cement, sand and water.

5. The composition defined by claim 2 in which the hydraulic cement includes Portland cement, sand and water.

6. The method defined by claim 1 wherein the hydraulic cement is a gypsum cement.

7. The composition defined by claim 2 in which the hydraulic cement is a gypsum cement.

References Cited in the file of this patent
UNITED STATES PATENTS

| | | |
|---|---|---|
| 1,960,440 | Hoevel | May 29, 1934 |
| 1,960,571 | Butterworth et al. | May 29, 1934 |
| 1,963,030 | Powell | June 12, 1934 |
| 2,029,311 | Elias | Feb. 4, 1936 |
| 2,045,099 | Pond | June 23, 1936 |
| 2,169,980 | Scripture | Aug. 15, 1939 |
| 2,329,322 | Baty et al. | Sept. 14, 1943 |
| 2,646,360 | Lea | July 21, 1953 |
| 2,746,086 | Vickers | May 22, 1956 |
| 2,755,509 | Smidth | July 24, 1956 |
| 2,797,201 | Veatch | June 25, 1957 |

FOREIGN PATENTS

| | | |
|---|---|---|
| 499,172 | Great Britain | Jan. 19, 1939 |